(12) United States Patent
van Iersel et al.

(10) Patent No.: US 11,180,704 B2
(45) Date of Patent: Nov. 23, 2021

(54) PROCESS FOR PRODUCING LPG AND BTX FROM MIXED HYDROCARBONS FEED

(71) Applicant: SABIC GLOBAL TECHNOLOGIES B.V., Bergen op Zoom (NL)

(72) Inventors: Maikel van Iersel, Den Bosch (NL); Luis Aramburo, Geleen (NL); Andrew Davies, Cleveland (GB); Emiel van Kimmenade, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 604 days.

(21) Appl. No.: 16/079,789

(22) PCT Filed: Feb. 21, 2017

(86) PCT No.: PCT/EP2017/053867
§ 371 (c)(1),
(2) Date: Aug. 24, 2018

(87) PCT Pub. No.: WO2017/148736
PCT Pub. Date: Sep. 8, 2017

(65) Prior Publication Data
US 2021/0179951 A1 Jun. 17, 2021

(30) Foreign Application Priority Data
Mar. 4, 2016 (EP) .................... 16158704

(51) Int. Cl.
*C10G 65/10* (2006.01)
*B01J 8/04* (2006.01)
(Continued)

(52) U.S. Cl.
CPC ............ *C10G 65/10* (2013.01); *B01J 8/0453* (2013.01); *B01J 29/62* (2013.01); *B01J 35/1057* (2013.01);
(Continued)

(58) Field of Classification Search
CPC .... C10G 47/18; C10G 65/10; C10G 2300/70; C10G 2300/4006; C10G 2300/4012;
(Continued)

(56) References Cited

U.S. PATENT DOCUMENTS

2006/0231464 A1 10/2006 Brignac et al.
2007/0062848 A1 3/2007 Oballa et al.
(Continued)

FOREIGN PATENT DOCUMENTS

WO 2013182534 A1 12/2013
WO WO 2015/000848 * 1/2015 ............. C10G 47/02
(Continued)

OTHER PUBLICATIONS

The American Petroleum Institute HPV Testing Group, Kerosene/Jet Fuel Category Assessment Document, Sep. 21, 2010.*
(Continued)

*Primary Examiner* — Brian A McCaig
(74) *Attorney, Agent, or Firm* — Cantor Colburn LLP

(57) ABSTRACT

The present invention relates to a process for producing LPG and BTX from a mixed feedstream comprising C5-C12 hydrocarbons by contacting said feedstream in the presence of hydrogen with a first hydrocracking catalyst and contacting the thus obtained first hydrocracked product in the presence of hydrogen with a second hydrocracking catalyst to produce a second hydrocracked product stream comprising LPG and BTX.

20 Claims, 2 Drawing Sheets

(51) Int. Cl.
- *B01J 29/62* (2006.01)
- *B01J 35/10* (2006.01)
- *C10G 47/18* (2006.01)

(52) U.S. Cl.
CPC ..... *C10G 47/18* (2013.01); *C10G 2300/4006* (2013.01); *C10G 2300/4012* (2013.01); *C10G 2300/4018* (2013.01); *C10G 2300/70* (2013.01); *C10G 2400/20* (2013.01); *C10G 2400/30* (2013.01)

(58) Field of Classification Search
CPC ........ C10G 2300/4018; C10G 2400/20; C10G 2400/30; B01J 8/0453; B01J 29/62; B01J 35/057
See application file for complete search history.

(56) References Cited

U.S. PATENT DOCUMENTS

| | | |
|---|---|---|
| 2007/0112237 A1 | 5/2007 | Lee et al. |
| 2008/0287561 A1 | 11/2008 | Menashi et al. |
| 2016/0369187 A1* | 12/2016 | Ward .................... C10G 47/02 |
| 2017/0058214 A1* | 3/2017 | Oprins .................. C10G 69/06 |

FOREIGN PATENT DOCUMENTS

| | | |
|---|---|---|
| WO | 2015128018 A1 | 9/2015 |
| WO | 2015128317 A1 | 9/2015 |
| WO | 2016005297 A1 | 1/2016 |

OTHER PUBLICATIONS

European Search Report issued in EP Application No. 16158704 dated Sep. 2, 2016, 3 pages.

International Preliminary Report on Patentability issued in Application No. PCT/EP2017/053867 dated Sep. 4, 2018, 10 pages.

International Search Report and Written Opinion of the Internatinal Searching Authority issued in Application No. PCT/EP2017/053867 dated Apr. 18, 2017, 15 pages.

Kirk-Othmer Encyclopedia of Chemical Technology, "Molecular Sieves," Fifth Edition, vol. 16, (2006), pp. 811-853.

* cited by examiner

PROCESS FOR PRODUCING LPG AND BTX FROM MIXED HYDROCARBONS FEED

CROSS REFERENCE TO RELATED APPLICATIONS

This application is a 371 of International Application No. PCT/EP2017/053867, filed Feb. 21, 2017, which claims priority to EP Application Serial No. 16158704.3 filed Mar. 4, 2016, which are incorporated herein by reference in their entirety.

The present invention relates to a process for producing LPG and BTX from a mixed feedstream comprising C5-C12 hydrocarbons by contacting said feedstream in the presence of hydrogen with a first hydrocracking catalyst and contacting the thus obtained first hydrocracked product in the presence of hydrogen with a second hydrocracking catalyst to produce a second hydrocracked product stream comprising LPG and BTX.

Processes for producing LPG and BTX from a mixed feedstream comprising C5-C12 hydrocarbons have been previously described. For instance, WO2013/182534 A1 describes a process comprising contacting a feedstream comprising C5-C12 hydrocarbons in the presence of hydrogen with a combined hydrocracking/hydrodesulphurisation catalyst comprising 0.1-1 wt-% hydrogenation metal in relation to the total catalyst weight and a zeolite having a pore size of 5-8 Å and a silica to alumina molar ratio of 5-200 under process conditions comprising a temperature of 450-580° C., a pressure of 300-5000 kPa gauge and a Weight Hourly Space Velocity of 0.1-10 h−1 to produce a hydrocracking product stream comprising BTX; and separating the BTX from the hydrocracking product stream. The process of WO2013/182534 A1 is characterized in that the hydrogenation metal/zeolite catalyst as described therein is contacted with C10-C12 hydrocarbons having more than one aromatic ring comprised in the feed. Such polyaromatic hydrocarbons may lead to carbon deposition on the catalyst leading to a reduced catalyst life.

It was an object of the present invention to provide an improved process for producing LPG and BTX from a mixed feedstream comprising C5-C12 hydrocarbons and bicyclic hydrocarbons such as decalin, which has an improved conversion of the polycyclic hydrocarbons comprised in the feed. Furthermore, it was an object of the present invention to provide a process for producing LPG and BTX from a mixed feedstream comprising C5-C12 hydrocarbons and bicyclic hydrocarbons having a reduced coke deposition on the catalyst and an improved catalyst life.

The solution to the above problem is achieved by providing the embodiments as described herein below and as characterized in the claims. Accordingly, the present invention provides a process for producing LPG and BTX comprising:
   (a) contacting a feedstream comprising C5-C12 hydrocarbons and bicyclic hydrocarbons in the presence of hydrogen with a first hydrocracking catalyst to produce a first hydrocracked product stream,
      wherein the first hydrocracking catalyst comprises 0.01-2 wt-% hydrogenation metal in relation to the total catalyst weight and an aluminosilicate zeolite having a pore size of 6-8 Å and a $SiO_2/Al_2O_3$ molar ratio of 1-150; and
   (b) contacting the first hydrocracked product in the presence of hydrogen with a second hydrocracking catalyst to produce a second hydrocracked product stream comprising LPG and BTX,
      wherein the second hydrocracking catalyst comprises 0.01-1 wt-% hydrogenation metal in relation to the total catalyst weight and an aluminosilicate zeolite having a pore size of 5-6 Å and a $SiO_2/Al_2O_3$ molar ratio of 5-200,
wherein step (a) is performed at a temperature of 325-425° C., a pressure of 10-4000 kPa gauge, a Weight Hourly Space Velocity (WHSV) of 0.5-24 $h^{-1}$, and a hydrogen:hydrocarbon ($H_2$:HC) molar ratio of 1-4; and step (b) is performed at a temperature of 325-500° C., a pressure of 10-4000 kPa gauge, a WHSV of 0.5-20 $h^{-1}$ and a $H_2$:HC molar ratio of 1-4.

Preferably, the process temperature used in the first hydrocracking step (a) is lower or equal to the temperature used in the second hydrocracking step (b). The process temperature as indicated in the context of the present invention relates to the temperature of the feed that is contacted with the catalyst. In a reactor comprising a single reactor bed, accordingly, the process temperature equals the inlet temperature of the feed to the reactor.

In the context of the present invention, it was surprisingly found that by specifically combining the herein described first hydrocracking step with the second hydrocracking step, the bicyclic hydrocarbon compounds comprised in the feed can be preferably converted into LPG and BTX instead of being converted into naphthalene, which is believed to function as a coke precursor in hydrocracking reactions.

The term "bicyclic hydrocarbons" as used herein relates to hydrocarbons having two fused cyclic ring structures, wherein each of said carbocyclic ring structure may be an aromatic ring or an aliphatic ring. Non-limiting examples of such bicyclic hydrocarbons are decalin, tetralin, naphthalene and their methylated derivatives.

The term "aromatic hydrocarbons" or "aromatics" is very well known in the art. Accordingly, the term "aromatic hydrocarbon" relates to cyclically conjugated hydrocarbon with a stability (due to delocalization) that is significantly greater than that of a hypothetical localized structure (e.g. Kekulé structure). The most common method for determining aromaticity of a given hydrocarbon is the observation of diatropicity in the 1H NMR spectrum, for example the presence of chemical shifts in the range of from 7.2 to 7.3 ppm for benzene ring protons. As used herein, the term "polyaromatics" or "polyaromatic hydrocarbons" relates to a mixture of aromatic hydrocarbons having more than one aromatic ring. As used herein, the term "monoaromatic hydrocarbons" or "monoaromatics" relates to a mixture of aromatic hydrocarbons having only one aromatic ring.

The term "BTX" as used herein relates to a mixture of benzene, toluene and xylenes.

As used herein, the term "C# hydrocarbons", or "C#", wherein "#" is a positive integer, is meant to describe all hydrocarbons having # carbon atoms. Moreover, the term "C#+ hydrocarbons" is meant to describe all hydrocarbon molecules having # or more carbon atoms. Accordingly, the term "C9+ hydrocarbons" is meant to describe a mixture of hydrocarbons having 9 or more carbon atoms. The term "C9+ alkanes" accordingly relates to alkanes having 9 or more carbon atoms.

The term "LPG" as used herein refers to the well-established acronym for the term "liquefied petroleum gas". LPG generally consists of a blend of C2-C4 hydrocarbons i.e. a mixture of C2, C3, and C4 hydrocarbons.

Zeolites are well-known molecular sieves having a well-defined pore size. As used herein, the term "zeolite" or "aluminosilicate zeolite" relates to an aluminosilicate molecular sieve. An overview of their characteristics is for example provided by the chapter on Molecular Sieves in Kirk-Othmer Encyclopedia of Chemical Technology, Volume 16, p 811-853; in Atlas of Zeolite Framework Types, 5th edition, (Elsevier, 2001).

Accordingly, the process of the present invention involves contacting a feedstream comprising C5-C12 hydrocarbons and polyaromatics in the presence of hydrogen with a first hydrocracking catalyst to produce a first hydrocracked product stream.

The feedstream used in the process of the present invention is a mixture comprising C5-C12 hydrocarbons, preferably having a boiling point in the range of 30-200° C. Suitable feedstreams include, but are not limited to first stage hydro-treated pyrolysis gasoline, straight run naphtha, hydrocracked gasoline, light coker naphtha and coke oven light oil, FCC gasoline, reformate or mixtures thereof. The process of the present invention is particularly suitable for processing a hydrocarbon feedstream having a relatively low content of aromatic hydrocarbons, such as straight run naphtha, hydrocracked gasoline, light coker naphtha and coke oven light oil, FCC gasoline or mixtures thereof. Accordingly, the feedstream used in the process of the present invention preferably comprises straight run naphtha, hydrocracked gasoline, light coker naphtha and coke oven light oil, FCC gasoline or mixtures thereof.

First Hydrocracking Step

Figure 1:
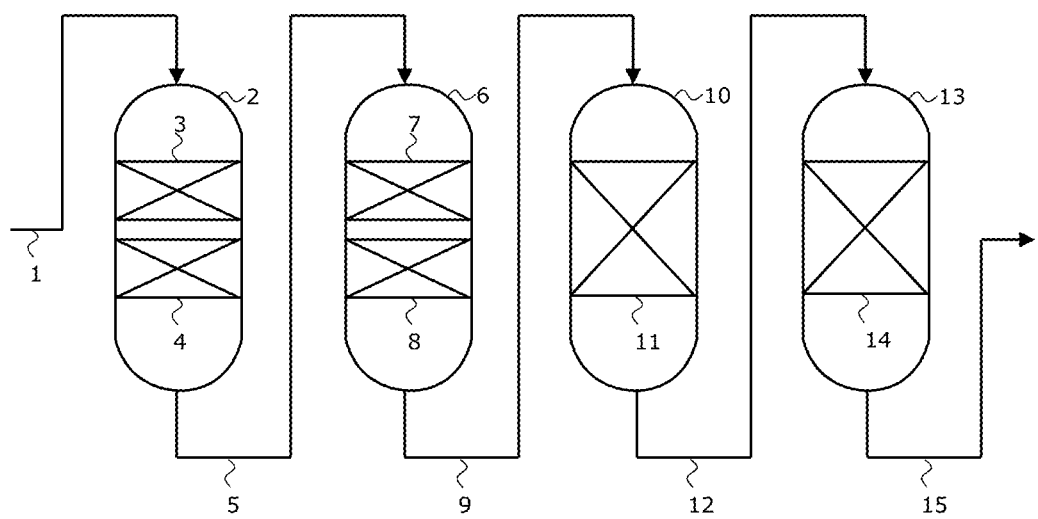
FIG. 1 is a schematic of a process depicting a series of hydrocracking reactors, according to the present disclosure.

The first hydrocracking step in the process of the present invention involves contacting the feedstream in the presence of hydrogen with the first hydrocracking catalyst under process conditions comprising a temperature of 325-425° C., a pressure of 10-4000 kPa gauge, a WHSV of 0.5-24 $h^{-1}$ and a $H_2$:HC molar ratio of 1-4.

The process conditions used for the first hydrocracking step are essential to prevent that the bicyclic hydrocarbons are dehydrogenated to form tertralin or naphthalene. Such process conditions comprise a temperature of 325-425° C., a pressure of 10-4000 kPa gauge a WHSV of 0.5-24 $h^{-1}$ and a hydrogen:hydrocarbon ($H_2$:HC) molar ratio of 1-4.

In some preferred embodiments, the first hydrocracking step is performed at a temperature of 325-425° C., for example at least 335° C., at least 345° C. or at least 350° C. and/or at most 415° C., at most 405° C. or at most 400° C.

In some preferred embodiments, the first hydrocracking step is performed at a pressure of 10-4000 kPa gauge for example at least 100 kPa, at least 500 kPa or at least 800 kPa and/or at most 3000 kPa, at most 2500 kPa or at most 2000 kPa.

In some preferred embodiments, the first hydrocracking step is performed at a Weight Hourly Space Velocity of 0.5-24 $h^{-1}$, for example at least 2 $h^{-1}$, at least 4 $h^{-1}$ or at least 6 $h^{-1}$, and/or at most 24 $h^{-1}$, at most 22 $h^{-1}$ or at most 20 $h^{-1}$.

The first hydrocracking step is preferably performed in the presence of an excess amount of hydrogen in the reaction mixture. This means that a more than stoichiometric amount of hydrogen is present in the reaction mixture that is subjected to hydrocracking. Preferably, the molar ratio of hydrogen to hydrocarbon species (H2/HC molar ratio) in the reactor feed is 1-4 (i.e. between 1:1 and 4:1), preferably 1-3 and most preferably 1-2. In this context the term "hydrocarbon species" means all hydrocarbon molecules present in the reactor feed such as benzene, toluene, hexane, cyclohexane etc. It is necessary to know the composition of the feed to then calculate the average molecular weight of this stream to be able to calculate the correct hydrogen feed rate. The excess amount of hydrogen in the reaction mixture suppresses the coke formation, which is believed to lead to catalyst deactivation.

The first hydrocracking catalyst comprises 0.01-2 wt-% hydrogenation metal in relation to the total catalyst weight and an aluminosilicate zeolite having a pore size of 6-8 Å and a $SiO_2/Al_2O_3$ molar ratio of 1-150.

Accordingly, the hydrocracking catalyst used in the first hydrocracking step is a catalyst composition comprising a hydrogenation metal. Hydrogenation metals are very well known in the art. Accordingly, the first hydrocracking catalyst preferably comprises one or more transition metals, preferably selected from Groups 6-11 of the Periodic Table of Elements. The catalysts used in the first hydrocracking step more preferably comprises one or more elements selected from the group consisting of Pd, Rh, Ru, Ir, Os, Cu, Co, Ni, Pt, Fe, Zn, Ga, In, Mo, W and V in metallic or metal sulphide form supported on an acidic solid such as alumina, silica, alumina-silica, magnesia and zeolites. In this respect, it is to be noted that the term "supported on" as used herein includes any conventional way to provide a catalyst which combines one or more elements with a catalytic support.

Accordingly, the hydrocracking catalyst used in the first hydrocracking step comprises an aluminosilicate zeolite having a pore size of 6-8 Å. Such zeolites having a pore size of 6-8 Å are also generally described by the term "large pore size zeolite". Suitable large pore zeolites include, but are not limited to, zeolite Y, faujasite (FAU), beta zeolite (BEA), and chabazite (CHA). Preferably, the catalyst used in the first hydrocracking step comprises an aluminosilicate zeolite having a 12-ring structure, i.e. a zeolite wherein the pore is formed by a ring consisting of 12 $[SiO_4]$ or $[AlO_4]^+$ tetrahedra.

The aluminosilicate zeolite used in the in the first hydrocracking step may have a $SiO_2/Al_2O_3$ ratio of 1-150. Means and methods for quantifying the $SiO_2$ to $Al_2O_3$ molar ratio of a zeolite are well known in the art and include, but are not limited to AAS (Atomic Absorption Spectrometer), ICP (Inductively Coupled Plasma Spectrometry) analysis or XRF (X-ray fluorescence). It is noted that the $SiO_2$ to $Al_2O_3$ molar ratio referred herein is meant as the ratio in the zeolite prior to being mixed with the binder for forming the shaped body. Preferably, the $SiO_2$ to $Al_2O_3$ molar ratio is measured by XRF.

In some preferred embodiments, the first hydrocracking catalyst comprises 0.01-2 wt-% hydrogenation metal (as defined herein always in relation to the total catalyst weight), for example at least 0.05 wt-% hydrogenation metal, at least 0.07 wt-% hydrogenation metal or at least 0.1 wt-% hydrogenation metal and/or at most 1.5 wt-% hydrogenation metal, at most 1.2 wt-% hydrogenation metal or at most 1 wt-% hydrogenation metal.

In some preferred embodiments, the first hydrocracking catalyst comprises an aluminosilicate zeolite having a $SiO_2/Al_2O_3$ molar ratio of 1-150, for example a $SiO_2/Al_2O_3$ molar ratio of at least 3, a $SiO_2/Al_2O_3$ molar ratio of or at least 4, or a $SiO_2/Al_2O_3$ molar ratio of or at least 5 and/or a $SiO_2/Al_2O_3$ molar ratio of at most 130, a $SiO_2/Al_2O_3$ molar ratio of at most 110 or a $SiO_2/Al_2O_3$ molar ratio of at most 100.

Preferably, the hydrogenation metal of the first hydrocracking catalyst is at least one element selected from Group 10 of the periodic table of Elements. Most preferably, the hydrogenation metal of the first hydrocracking catalyst is palladium (Pd). In the context of the present invention, it was found that the hydrogenation metal Pd is preferred over other Group 10 hydrogenation metals, such as Pt, since this leads to a reduced dehydrogenation of the bicycylic hydrocarbons towards naphthalene.

Preferably, the aluminosilicate zeolite comprised in the first hydrocracking catalyst is selected from the group consisting of zeolite Y, faujasite (FAU), beta zeolite (BEA), and chabazite (CHA). Most preferably the aluminosilicate zeolite comprised in the first hydrocracking catalyst is zeolite Y. Depending on the silica-to-alumina molar ratio ("$SiO_2/Al_2O_3$ molar ratio" or "$SiO_2/Al_2O_3$ ratio") of their framework, synthetic faujasite zeolites are divided into zeolite X and zeolite Y. In X zeolites the $SiO_2/Al_2O_3$ ratio is between 2 and 3, while in Y zeolites it is 3 or higher. Accordingly, zeolite Y is a synthetic faujasite zeolite having a $SiO_2/Al_2O_3$ ratio in their framework of 3 or more. Preferably, the zeolite in the selective alkylation catalyst is in the so-called hydrogen form, meaning that its sodium or potassium content is very low, preferably below 0.1, 0.05, 0.02 or 0.01 wt-%, more preferably presence of sodium is below detection limits.

Accordingly, the hydrocracking catalyst used in the first hydrocracking step is a catalyst composition that combines a hydrogenation metal having hydrogenation function and an aluminosilicate zeolite having an acid (cracking) function. Such catalyst may either be in the form of a mixture of different catalyst components having different catalyst function or in the form of a bifunctional catalyst that combines both the acid and the hydrogenation function in one catalyst component comprised in the catalyst composition. Hence, the first hydrocracking catalyst may be a mixture of the zeolite and the hydrogenation metal on a support of an amorphous alumina. Alternatively, the first hydrocracking catalyst may comprise the hydrogenation metal on a support of the zeolite.

The first hydrocracking step as described herein produces the first hydrocracked product. In the first hydrocracked product stream, the content of bicyclic hydrocarbons is significantly reduced when compared to the feed to the first hydrocracking step. Preferably, the first hydrocracked product stream comprises at most 5 wt-% bicyclic hydrocarbons, more preferably at most 3 wt-% bicyclic hydrocarbons, even more preferably at most 2 wt-% bicyclic hydrocarbons and most preferably at most 1 wt-% bicyclic hydrocarbons.

Second Hydrocracking Step

The second hydrocracking step in the process of the present invention involves contacting the first hydrocracked product in the presence of hydrogen with a second hydrocracking catalyst to produce a second hydrocracked product stream comprising LPG and BTX.

Accordingly, the process of the present invention is characterized in that the product of the first hydrocracking step is directly subjected to the second hydrocracking step without intermediate separation.

The process conditions used for the second hydrocracking step are essential to allow conversion of the feed to BTX and LPG. Such process conditions comprise a temperature of 325-500° C., a pressure of 10-4000 kPa gauge, a Weight Hourly Space Velocity of 0.5-20 $h^{-1}$ and a $H_2$:HC molar ratio of 1-4.

In some preferred embodiments, the second hydrocracking step is performed at a temperature of 325-500° C., for example at least 335° C., at least 345° C. or at least 350° C. and/or at most 480° C., at most 460° C. or at most 450° C.

In some preferred embodiments, the second hydrocracking step is performed at a pressure of 0.5-3 kPa gauge for example at least 0.7 kPa, at least 0.6 kPa or at least 1 kPa and/or at most 2.5 kPa, at most 2.2 kPa or at most 2 kPa.

In some preferred embodiments, the second hydrocracking step is performed at a Weight Hourly Space Velocity of 0.5-20 $h^{-1}$, for example at least 0.7 $h^{-1}$, at least 0.9 $h^{-1}$ or at least 1 $h^{-1}$, and/or at most 15 $h^{-1}$, at most 10 $h^{-1}$ or at most 6 $h^{-1}$.

The second hydrocracking step is preferably performed in the presence of an excess amount of hydrogen in the reaction mixture. This means that a more than stoichiometric amount of hydrogen is present in the reaction mixture that is subjected to hydrocracking. Preferably, the molar ratio of hydrogen to hydrocarbon species (H2/HC molar ratio) in the reactor feed is between 1:1 and 4:1, preferably between 1:1 and 3:1 and most preferably between 1:1 and 2:1. Again, the excess amount of hydrogen in the reaction mixture suppresses the coke formation, which is believed to lead to catalyst deactivation.

The second hydrocracking catalyst comprises 0.01-1 wt-% hydrogenation metal in relation to the total catalyst weight and an aluminosilicate zeolite having a pore size of 5-6 Å and a $SiO_2/Al_2O_3$ molar ratio of 5-200.

Accordingly, the hydrocracking catalyst used in the second hydrocracking step is a catalyst composition comprising a hydrogenation metal. The hydrogenation metal comprised in the second hydrocracking catalyst may be the same hydrogenation metal as comprised in the first hydrocracking catalyst or may be a different hydrogenation metal. The catalyst used in the second hydrocracking step more preferably comprises one or more elements selected from the group consisting of Pd, Rh, Ru, Ir, Os, Cu, Co, Ni, Pt, Fe, Zn, Ga, In, Mo, W and V in metallic or metal sulphide form supported on an acidic solid such as alumina, silica, alumina-silica, magnesia and zeolites.

Accordingly, the hydrocracking catalyst used in the second hydrocracking step comprises an aluminosilicate zeolite having a pore size of 5-6 Å. Such zeolites having a pore size of 5-6 Å are also generally described by the term "medium pore size zeolite". Suitable medium pore zeolites include, but are not limited to, MCM-22 (MWW), mordenite (MOR) and ZSM-5 (MFI). Preferably, the catalyst used in the second hydrocracking step comprises an aluminosilicate zeolite having a 10-ring structure. i.e. a zeolite wherein the pore is formed by a ring consisting of 10 $[SiO_4]$ or $[AlO_4]^+$ tetrahedra.

The aluminosilicate zeolite used in the in the second hydrocracking step may have a $SiO_2/Al_2O_3$ ratio of 5-200. Means and methods for quantifying the 902 to $Al_2O_3$ molar ratio of a zeolite are well known in the art and include, but are not limited to AAS (Atomic Absorption Spectrometer), ICP (Inductively Coupled Plasma Spectrometry) analysis or XRF (X-ray fluorescence). It is noted that the 902 to $Al_2O_3$ molar ratio referred herein is meant as the ratio in the zeolite prior to being mixed with the binder for forming the shaped body. Preferably, the $SiO_2$ to $Al_2O_3$ molar ratio is measured by XRF.

In some preferred embodiments, the second hydrocracking catalyst comprises 0.01-1 wt-% hydrogenation metal (as defined herein always in relation to the total catalyst weight), for example at least 0.05 wt-% hydrogenation metal, at least 0.07 wt-% hydrogenation metal or at least 0.1 wt-% hydrogenation metal and/or at most 0.8 wt-% hydrogenation metal, at most 0.6 wt-% hydrogenation metal or at most 0.5 wt-% hydrogenation metal.

In some preferred embodiments, the second hydrocracking catalyst comprises an aluminosilicate zeolite having a $SiO_2/Al_2O_3$ molar ratio of 5-200, for example a $SiO_2/Al_2O_3$ molar ratio of at least 7, a $SiO_2/Al_2O_3$ molar ratio of or at least 9, or a $SiO_2/Al_2O_3$ molar ratio of or at least 10 and/or a $SiO_2/Al_2O_3$ molar ratio of at most 180, a $SiO_2/Al_2O_3$ molar ratio of at most 160 or a $SiO_2/Al_2O_3$ molar ratio of at most 150.

Preferably, the hydrogenation metal of the second hydrocracking catalyst is at least one element selected from Group 10 of the periodic table of Elements. Most preferably, the hydrogenation metal of the second hydrocracking catalyst is Pt.

Preferably, the aluminosilicate zeolite comprised in the catalyst used in the second hydrocracking step (b) is selected from the group consisting of MCM-22 (MWW), mordenite (MOR) and ZSM-5 (MFI). Most preferably, the aluminosilicate zeolite comprised in the catalyst used in the second hydrocracking step (b) is ZSM-5.

Accordingly, the hydrocracking catalyst used in the second hydrocracking step (b) is a catalyst composition that combines the hydrogenation metal Pt having hydrogenation function and an aluminosilicate zeolite having an acid (cracking) function. Such catalyst may either be in the form of a mixture of different catalyst components having different catalyst function or in the form of a bifunctional catalyst that combines both the acid and the hydrogenation function in one catalyst component comprised in the catalyst composition. Hence, the second hydrocracking catalyst may be a mixture of the zeolite and hydrogenation metal on a support of an amorphous alumina. Alternatively, the second hydrocracking catalyst may comprise the hydrogenation metal on a support of the zeolite.

As described herein, the process of the present invention is characterized in that the product of the first hydrocracking step is directly subjected to the second hydrocracking step without intermediate separation. It is preferred that steps (a) and (b) as described herein are performed in a single reactor.

Accordingly, in the process of the present invention, the reactor may have a first catalyst layer comprising the first hydrocracking catalyst and a second catalyst layer comprising the second hydrocracking catalyst, wherein a space or an inert layer is present between the first catalyst layer and the second catalyst layer.

Alternatively, the reactor in the process of the present invention may have a first catalyst layer comprising the first hydrocracking catalyst and a second catalyst layer comprising the second hydrocracking catalyst, wherein the first catalyst layer is in contact with the second catalyst layer.

The process of the present invention may further comprise subjecting the second hydrocracked product stream to separation to provide a C6+ stream and contacting the thus obtained C6+ stream in the presence of hydrogen with a third hydrocracking catalyst at temperature of 325-600° C., a pressure of 10-4000 kPa gauge and a Weight Hourly Space Velocity of 0.1-30 $h^{-1}$ to produce a third hydrocracked product stream comprising LPG and BTX, wherein the third hydrocracking catalyst comprises 0.01-1 wt-% hydrogenation metal in relation to the total catalyst weight and a zeolite having a pore size of 5-6 Å and $SiO_2/Al_2O_3$ ratio of 5-200.

In the context of the present invention, it was found that eventually remaining co-boilers of BTX comprised in the second hydrocracked product stream can be easily removed from said second hydrocracked product stream by subjecting said second hydrocracked product stream to one or more subsequent hydrocracking steps, wherein the hydrocracking process conditions, such as the temperature, in said subsequent hydrocracking steps are more severe when compared to the process conditions employed in the first and the second hydrocracking process step according to the present invention.

Process suitable for hydrocracking of a hydrocracked naphtha are known in the art; see e.g. WO 2013/182534 A1 and US 2008/0287561 A1. Preferably, the process conditions used for the optional third hydrocracking step generally includes a temperature of 400-600° C., a pressure of 300-5000 kPa gauge and a Weight Hourly Space Velocity of 0.1-30 $h^{-1}$. The hydrocracking catalyst used in the third hydrocracking step (c) typically comprises 0.01-1 wt-% hydrogenation metal in relation to the total catalyst weight and a zeolite having a pore size of 5-8 Å and a silica ($SiO_2$) to alumina ($Al_2O_3$) molar ratio of 5-200.

Preferably, the optional third hydrocracking step comprises contacting the second hydrocracked product in the presence of hydrogen with a hydrocracking catalyst under hydrocracking conditions, wherein said hydrocracking catalyst comprises one or more elements selected from the group consisting of Pt and Pd and an aluminosilicate zeolite, and wherein said hydrocracking conditions comprise a temperature of 400-600° C., a pressure of 300-5000 kPa gauge and a WHSV of 0.1-15 $h^{-1}$.

Preferably, the catalyst used in the optional third hydrocracking step comprises 0.01-1 wt-% hydrogenation metal in relation to the total catalyst weight and a zeolite having a pore size of 5-8 Å and $SiO_2/Al_2O_3$ ratio of 5-200, and wherein the process conditions in the optional third hydrocracking step comprises a temperature of 425-580° C., a pressure of 300-5000 kPa gauge and a Weight Hourly Space Velocity of 0.1-15 $h^{-1}$.

Accordingly, the process conditions that may be used in the in the optional third hydrocracking step of the process of the present invention comprise a temperature of 400-600° C., a pressure of 300-5000 kPa gauge and a WHSV of 0.1-15 $h^{-1}$.

Preferably, the process conditions used for optional third hydrocracking step comprise 425-580° C., a pressure of 300-5000 kPa gauge and a Weight Hourly Space Velocity of 0.1-15 $h^{-1}$.

In some preferred embodiments, the optional third hydrocracking step is performed at a pressure of 300-5000 kPa, for example at least 600 kPa, 1000 kPa or at least 1200 kPa and/or at most 3000 kPa, at most 2000 kPa or at most 1600 kPa. By increasing reactor pressure, conversion of C5+ non-aromatics can be increased, but higher pressure also increases the yield of methane and the hydrogenation of aromatic rings to cyclohexane species which can be cracked to LPG species. This results in a reduction in aromatic yield as the pressure is increased and, as some cyclohexane and its isomer methylcyclopentane, are not fully hydrocracked, there is an optimum in the purity of the resultant benzene at a pressure of 1000-2500 kPa.

In some preferred embodiments, the optional third hydrocracking step is performed at a temperature of a temperature of 400-600° C., for example at least 410° C., at least 415° C., at least 420° C. or at least 425° C. and/or at most 575° C., at most 550° C. or at most 525° C. The higher temperature range results in a high hydrocracking conversion rate.

In some preferred embodiments, the optional third hydrocracking step is performed at a Weight Hourly Space Velocity of 0.1-15 h$^{-1}$, for example at least 0.3 h$^{-1}$, at least 0.5 h$^{-1}$, at least 0.8 h$^{-1}$ or at least 1 h$^{-1}$ and/or at most 13 h$^{-1}$, at most 10 h$^{-1}$, at most 8 h$^{-1}$ or at most 5 h$^{-1}$. A higher WHSV allows particularly small reactor volumes and lower CAPEX.

The catalyst that may be used in the in the optional third hydrocracking step comprises one or more elements selected from the group consisting of Pt and Pd and an aluminosilicate zeolite.

Preferably, the catalyst used in the optional third hydrocracking step comprises 0.01-1 wt-% hydrogenation metal in relation to the total catalyst weight and a zeolite having a pore size of 5-6 Å and SiO$_2$/Al$_2$O$_3$ ratio of 5-200.

Preferably, the aluminosilicate zeolite comprised in the catalyst used in the optional third hydrocracking step is ZSM-5.

Preferably, the silica (SiO$_2$) to alumina (Al$_2$O$_3$) molar ratio of the ZSM-5 zeolite used in the optional third hydrocracking step is in the range of 30-100. It was found that using a zeolite having a SiO$_2$ to Al$_2$O$_3$ molar ratio of 30-100 shows the optimum catalyst performances as measured by activity (as measured by WHSV), contents of benzene and total aromatics (BTX, ethylbenzene (EB) and heavies) and methane in the product stream. It is noted that the SiO$_2$ to Al$_2$O$_3$ molar ratio referred herein is meant as the ratio in the zeolite prior to being mixed with the binder for forming the shaped body. Preferably, the SiO$_2$ to Al$_2$O$_3$ molar ratio is measured by XRF.

The aluminosilicate zeolite comprised in the catalyst used in the optional third hydrocracking step comprises a hydrogenation metal. Preferably, the hydrogenation metal is at least one element selected from Group 10 of the periodic table of Elements. Preferred Group 10 elements are palladium and platinum. Preferably, the hydrogenation metal comprised in the catalyst used in the optional third hydrocracking step is Pt.

Preferably, the hydrocracking catalyst used in the optional third hydrocracking step comprises a shaped body comprising a zeolite and a binder and a hydrogenation metal deposited on the shaped body, wherein the amount of the hydrogenation metal is 0.010-0.30 wt % with respect to the total catalyst and wherein the zeolite is ZSM-5 having a the SiO$_2$ to Al$_2$O$_3$ molar ratio molar ratio of 30-100. When using this particularly preferred hydrocracking catalyst used in the optional third hydrocracking step, the hydrocracking conditions preferably comprise a temperature of 425-580° C., a pressure of 300-5000 kPa gauge and a Weight Hourly Space Velocity of 3-30 h–1 to produce a hydrocracking product stream comprising BTX. The specific selection of this hydrocracking catalyst in combination with these hydrocracking conditions results in a hydrocracking product stream comprising a low proportion of methane and substantially no co-boilers of BTX at a sufficiently high WHSV. A low proportion of methane means that more valuable components such as C2-C4 hydrocarbons and BTX are present in the hydrocracking product stream. The absence of co-boilers of BTX in the product stream allows obtaining a chemical grade BTX by simple distillation of the product stream. This can be achieved at a relatively high level of WHSV, which means that the desired product can be obtained at a higher rate requiring smaller volume reactor resulting in a smaller CAPEX.

The process of the present invention may further comprise separation step wherein the product produced by the final hydrocracking step is subjected to separation to provide a LPG stream and a BTX stream. This separation step preferably comprises gas-liquid separation.

In the process according to the present invention, the feedstream may be subjected more than once to the first hydrocracking step (a) followed by the second hydrocracking step (b) as described herein. In one preferred embodiment of the present invention, the feedstream is fed to a first reactor, after which the thus obtained reactor product is fed to a second reactor, after which the thus obtained reactor product is subjected to separation to provide a C6+ stream and the thus obtained C6+ stream is fed to a third reactor, wherein the first hydrocracking step (a) and second hydrocracking (b) as described herein are performed in said first reactor, and wherein the first hydrocracking step (a) and second hydrocracking (b) as described herein are performed in said second reactor, and wherein the third hydrocracking step as defined herein is performed in said third reactor. In this embodiment, accordingly the feed is first subjected to the first hydrocracking step (a), followed by the second hydrocracking step (b), followed by the first hydrocracking step (a), followed by the second hydrocracking step (b), followed by the third hydrocracking step.

The process of the present invention accordingly produces LPG and BTX as high-value petrochemical products. Preferably, the process of the present invention produces chemical grade BTX without the need of extractive distillation to remove the co-boilers of BTX. As used herein, the term "chemical grade BTX" relates to a hydrocarbon mixture comprising less than 5 wt % hydrocarbons other than benzene, toluene and xylenes, preferably less than 4 wt % hydrocarbons other than benzene, toluene and xylenes, more preferably less than 3 wt % hydrocarbons other than benzene, toluene and xylenes, and most preferably less than 2.5 wt % hydrocarbons other than benzene, toluene and xylenes. Furthermore, the "chemical grade BTX" produced by the process of the present invention comprises less than 1 wt % non-aromatic C6+ hydrocarbons, preferably less than 0.7 wt % non-aromatic C6+ hydrocarbons, more preferably less than 0.5 wt % non-aromatic C6+ hydrocarbons and most preferably less than 0.2 wt % non-aromatic C6+ hydrocarbons. The most critical contaminants are the non-aromatic species which have boiling points close to benzene including, but not limited to, cyclohexane, methylcyclopentane, n-hexane, 2-methylpentane and 3-methylpentane. Preferably, the product produced in the process of the present invention comprises further useful aromatic hydrocarbons such as ethylbenzene. The BTX product as produced may be a physical mixture of the different aromatic hydrocarbons or may be directly subjected to further separation, e.g. by distillation, to provide different purified product streams. Such purified product stream may include a benzene product stream, a toluene product stream and/or a xylene product stream.

Furthermore, the present invention provides the fixed bed reactor useful for performing the process for producing LPG and BTX as described herein. Accordingly, the present invention provides a fixed bed reactor comprising, in this order, (i) an inlet, (ii) a first reaction zone comprising a first hydrocracking catalyst comprising 0.01-2 wt-% hydrogenation metal in relation to the total catalyst weight and an aluminosilicate zeolite having a pore size of 6-8 Å and a SiO$_2$/Al$_2$O$_3$ molar ratio of 1-150, (iii) a second reaction zone comprising a second hydrocracking catalyst comprising 0.01-1 wt-% of the hydrogenation metal in relation to the total catalyst weight and an aluminosilicate zeolite having a pore size of 5-6 Å and a SiO$_2$/Al$_2$O$_3$ molar ratio of 5-200 and (iv) an outlet.

Preferably, the fixed bed reactor of the present invention comprises a first reaction zone comprising a first hydrocracking catalyst as further defined herein above.

Preferably, the fixed bed reactor of the present invention comprises a second reaction zone comprising a second hydrocracking catalyst as further defined herein above.

It is noted that the invention relates to all possible combinations of features described herein, particularly features recited in the claims.

It is further noted that the term "comprising" does not exclude the presence of other elements. However, it is also to be understood that a description on a product comprising certain components also discloses a product consisting of these components. Similarly, it is also to be understood that a description on a process comprising certain steps also discloses a process consisting of these steps.

EXAMPLE

Aspen simulations have been performed at different temperatures (at 1379 kPa (200 psig) and $H_2$:HC ratio of 3) to assess the effect induced by this parameter on the extent with which decalin is dehydrogenated in a hydrocracking reaction train. The results obtained from these simulations are summarized in Table 1 showing important differences in the extent with which tetralin is dehydrogenated at 375° C. and 450° C. Despite the fact that the concentration of decalin is low in both cases, the relative concentration of tetralin and naphthalene is strongly influenced by temperature conditions. Specifically, at 450° C. 80% of the decalin occurring in the feed is transformed into naphthalene, whereas at 375° C. the concentration of naphthalene is less than half of the amount of decalin present in the feed.

TABLE 1

Aspen simulations, performed using the Peng Robinson thermodynamic equation of state to assess the extent with which decalin is dehydrogenated to naphthalene at different temperature conditions.

|  | Feed | Outlet 1 | Outlet 2 |
| --- | --- | --- | --- |
| Temperature (° C.) | 375 | 375 | 450 |
| Pressure (kPa) | 1379 | 1379 | 1379 |
| Mass Flow (kg/h) | 360.75 | 360.75 | 360.75 |
| Mole Flow (kmol/h) |  |  |  |
| Cis-decalin | 2.5 | 0.02 | <0.001 |
| Trans-decalin |  | 0.156 | <0.001 |
| Naphthalene |  | 1.14 | 2 |
| Tetralin |  | 1.19 | 0.193 |
| Hydrogen | 7.5 | 16.8 | 19.61 |

These differences are of outmost importance to the invention given that aromatic molecules (such as naphthalene) cannot be ring opened without been partially hydrogenated (i.e., tetralin). Consequently, these results are informative of the fact that in order to maximize the ring contraction and ring opening reactions of the di-ring structures present in the feedstream comprising C5-C12 hydrocarbons and polyaromatics, the pre-layer of wide pore zeolite and hydrogenation catalyst should operate at the lower possible hydrocracker temperatures, namely at the beginning of the series of hydrocracking reactors, as depicted in FIG. 1. FIG. 1 describes a series of 4 subsequent reactors (2), (6), (10), and (13), wherein in reactor (2) the hydrocarbon feed (1) is subjected to the first hydrocracking step (a) followed by the second hydrocracking step (b) as described herein in reactor beds (3), respectively (4). The product of reactor (2) is fed to reactor (6) via line (5) and is again subjected to the first hydrocracking step (a) followed by the second hydrocracking step (b) as described herein in reactor beds (7), respectively (8). The product of reactor (10) is fed to reactor (13) via line (12) and is again subjected to the third hydrocracking step as described herein in reactor bed (14), producing the process product (15). Optionally, the process of the present invention comprises a separation step between reactor (6) and reactor (10) to provide the C6+ stream that is subjected to the third hydrocracking step.

Figure 2:
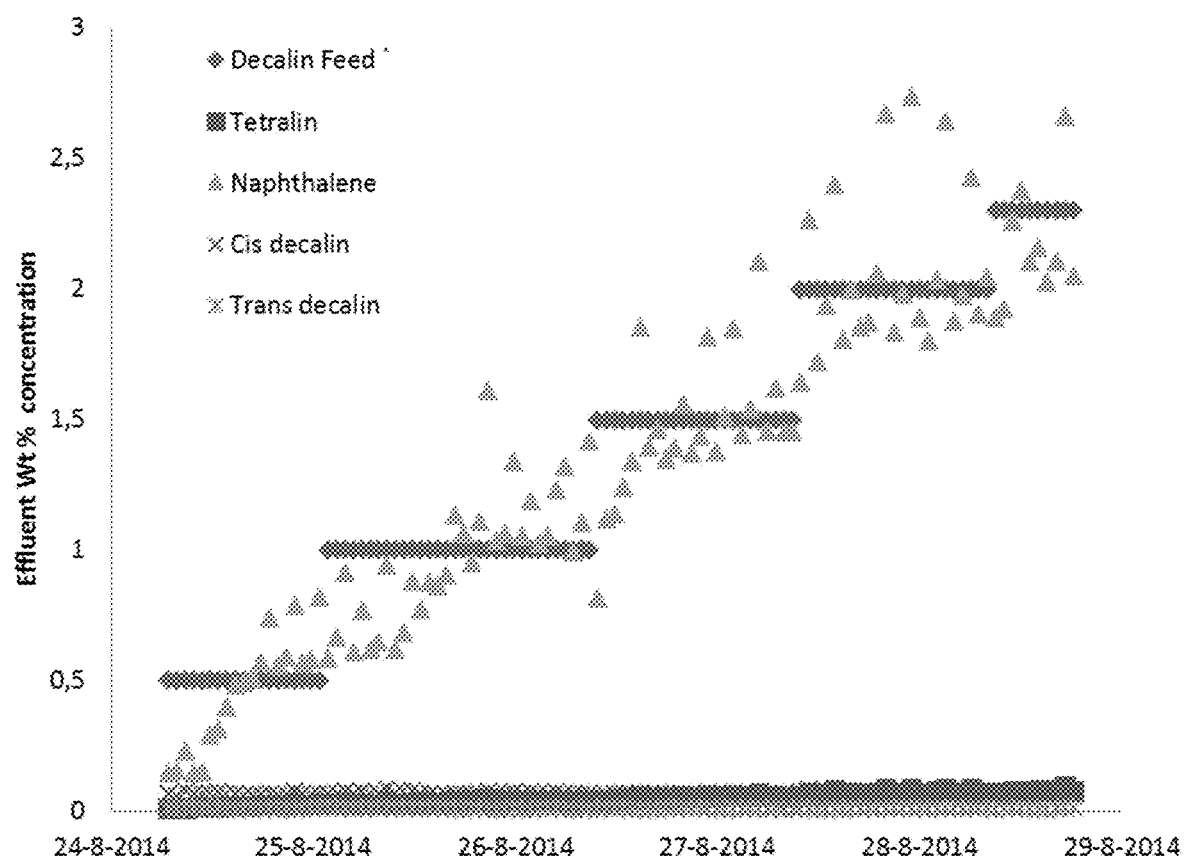
FIG. 2 is a graph showing effluent wt% concentration versus time, and showing that under selected reaction conditions the decalin present in the feed can be transformed into tetralin and naphthalene, according to the present disclosure.

To corroborate the above described aspen simulations experiments were performed with a naphtha feed containing increasing amounts of decalin (up to 2.5 wt %) at 1379 kPa (200 psig), WHSV of 2.6 $h^{-1}$, $H_2$:HC ratio of 3 and 450° C. The results obtained from these experiments are shown in FIG. 2 and the feed composition details summarized in Table 2. These results indicate that under the selected reaction conditions all the decalin present in the feed is transformed into tetralin and naphthalene. Moreover, the relative concentration of naphthalene and tetraline is similar to that obtained in the simulations.

TABLE 2

Naphtha feed composition

|  | Naphtha feed (wt-%) |
| --- | --- |
| Butane | 1.54 |
| Methyl Butane | 3.37 |
| Pentane | 5.16 |
| UK2 | 0.49 |
| 2-methylpentane | 9.57 |
| 3 methylpentane | 6.11 |
| Hexane | 13.89 |
| Methylcyclopentane | 5.24 |
| 2.4 Dimethylpentane | 0.12 |
| Benzene | 1.79 |
| Cyclohexane | 5.62 |
| trans 1-3 Dmcp | 1.12 |
| 1-3 Dmcp | 3.74 |
| 1-2 Dmcp | 1.03 |
| 2,2,4 Trimethylpentane | 1.95 |
| Heptane | 5.12 |
| Methylcyclohexane | 4.15 |
| Ethylcyclopentane | 0.58 |
| 2,3,3 Trimethylpentane | 0.00 |
| Toluene | 3.96 |
| Octane | 4.31 |
| Ethyl cyclohexane | 0.91 |
| Ethylbenzene | 1.06 |
| Meta/Para | 1.11 |
| OX | 0.74 |
| Nonane | 3.00 |
| iso Propyl Benzene | 0.26 |
| Propyl Benzene | 0.29 |
| 1-Methyl-3-Ethylbenzene | 0.61 |
| 1-Methyl-4-Ethylbenzene | 0.00 |
| 1,3,5-Trimethylbenzene | 0.25 |
| 1M2E Benzene | 0.15 |
| Pseudocumene | 1.01 |
| Indane | 0.12 |
| Indene | 0.03 |
| 1,3 De Benzene | 0.01 |
| Butyl Benzene | 0.07 |
| 2ethanyl 1,4 Dm Benzene | 0.00 |
| 1,4 Dm 2 E Benzene | 0.01 |
| 1M Indene | 0.01 |
| Naphthalene | 0.00 |
| 1,3,5 Triethylbenzene | 0.00 |
| Methyl Naphthalene (1) | 0.00 |
| Methyl Naphthalene (2) | 0.00 |

The invention claimed is:
1. A process for producing LPG and BTX comprising:
(a) contacting a feedstream comprising C5-C12 hydrocarbons and bicyclic hydrocarbons in the presence of hydrogen with a first hydrocracking catalyst to produce a first hydrocracked product stream, wherein the first hydrocracking catalyst comprises 0.01-2 wt-% hydrogenation metal in relation to the total catalyst weight and an aluminosilicate zeolite having a pore size of 6-8 Å and a $SiO_2/Al_2O_3$ molar ratio of 1-150; and (b) contacting the first hydrocracked product stream in the presence of hydrogen with a second hydrocracking catalyst to produce a second hydrocracked product stream comprising LPG and BTX, wherein the second hydrocracking catalyst comprises 0.01-1 wt-% hydrogenation metal in relation to the total catalyst weight and an aluminosilicate zeolite having a pore size of 5-6 Å and a $SiO_2/Al_2O_3$ molar ratio of 5-200, wherein step (a) is performed at a temperature of 325-425° C., a pressure of 10-4000 kPa gauge, a Weight Hourly Space Velocity (WHSV) of 0.5-24 $h^{-1}$ and a hydrogen:hydrocarbon ($H_2$:HC) molar ratio of 1-4; and step (b) is performed at a temperature of 325-500° C., a pressure of 10-4000 kPa gauge, a WHSV of 0.5-20 $h^{-1}$ and a $H_2$:HC molar ratio of 1-4;

wherein the feedstream comprises at least one of straight run naphtha, hydrocracked gasoline, light coker naphtha and coke oven light oil, or FCC gasoline.

2. The process according to claim 1, wherein the hydrogenation metal of the first hydrocracking catalyst is at least one element selected from Group 10 of the periodic table of Elements.

3. The process according to claim 1, wherein the aluminosilicate zeolite comprised in the first hydrocracking catalyst is selected from the group consisting of zeolite Y, faujasite (FAU), beta zeolite (BEA), and chabazite (CHA).

4. The process according to claim 1, wherein the hydrogenation metal of the second hydrocracking catalyst is at least one element selected from Group 10 of the periodic table of Elements.

5. The process according to claim 1, wherein the aluminosilicate zeolite comprised in the catalyst used in the second hydrocracking step (b) is selected from the group consisting of MCM-22 (MWW), mordenite (MOR) and ZSM-5 (MFI).

6. The process according to claim 1, wherein steps (a) and (b) are performed in a single reactor.

7. The process according to claim 1, wherein the first hydrocracking catalyst comprises the hydrogenation metal on a support of the zeolite.

8. The process according to claim 1, wherein the second hydrocracking catalyst is a mixture of the zeolite and the hydrogenation metal on a support of an amorphous alumina.

9. The process according to claim 1, wherein the second hydrocracking catalyst comprises the hydrogenation metal on a support of the zeolite.

10. The process according to claim 1, further comprising subjecting the second hydrocracked product stream to separation to provide a C6+ stream and contacting the thus obtained C6+ stream in the presence of hydrogen with a third hydrocracking catalyst at a temperature of 325-600° C., a pressure of 10-4000 kPa gauge and a Weight Hourly Space Velocity of 0.1-30 $h^{-1}$ to produce a third hydrocracked product stream comprising LPG and BTX, wherein the third hydrocracking catalyst comprises 0.01-1 wt-% hydrogenation metal in relation to the total catalyst weight and a zeolite having a pore size of 5-6 Å and a $SiO_2/Al_2O_3$ ratio of 5-200.

11. A fixed bed reactor comprising, in this order, (i) an inlet, (ii) a first reaction zone comprising a first hydrocracking catalyst comprising 0.01-2 wt-% hydrogenation metal in relation to the total catalyst weight and an aluminosilicate zeolite having a pore size of 6-8 Å and a $SiO_2/Al_2O_3$ molar ratio of 1-150, (iii) a second reaction zone comprising a second hydrocracking catalyst comprising 0.01-1 wt-% of the hydrogenation metal in relation to the total catalyst weight and an aluminosilicate zeolite having a pore size of 5-6 Å and a $SiO_2/Al_2O_3$ molar ratio of 5-200 and (iv) an outlet wherein the first hydrocracking catalyst is a mixture of the zeolite and the hydrogenation metal on a support of an amorphous alumina.

12. A process for producing LPG and BTX comprising:

(a) contacting a feedstream comprising C5-C12 hydrocarbons and bicyclic hydrocarbons in the presence of hydrogen with a first hydrocracking catalyst to produce a first hydrocracked product stream, wherein the first hydrocracking catalyst comprises 0.01-2 wt-% hydrogenation metal in relation to the total catalyst weight and an aluminosilicate zeolite having a pore size of 6-8 Å and a $SiO_2/Al_2O_3$ molar ratio of 1-150; and (b) contacting the first hydrocracked product stream in the presence of hydrogen with a second hydrocracking catalyst to produce a second hydrocracked product stream comprising LPG and BTX, wherein the second hydrocracking catalyst comprises 0.01-1 wt-% hydrogenation metal in relation to the total catalyst weight and an aluminosilicate zeolite having a pore size of 5-6 Å and a $SiO_2/Al_2O_3$ molar ratio of 5-200, wherein step (a) is performed at a temperature of 325-425° C., a pressure of 10-4000 kPa gauge, a Weight Hourly Space Velocity (WHSV) of 0.5-24 $h^{-1}$ and a hydrogen:hydrocarbon ($H_2$:HC) molar ratio of 1-4; and step (b) is performed at a temperature of 325-500° C., a pressure of 10-4000 kPa gauge, a WHSV of 0.5-20 $h^{-1}$ and a $H_2$:HC molar ratio of 1-4;

wherein the first hydrocracking catalyst is a mixture of the zeolite and the hydrogenation metal on a support of an amorphous alumina.

13. The process according to claim 12, wherein the feedstream comprises at least one of straight run naphtha, hydrocracked gasoline, light coker naphtha and coke oven light oil, or FCC gasoline.

14. The process according to claim 12, wherein the hydrogenation metal of the first hydrocracking catalyst is at least one element selected from Group 10 of the periodic table of Elements.

15. The process according to claim 12, wherein the aluminosilicate zeolite comprised in the first hydrocracking catalyst is selected from the group consisting of zeolite Y, faujasite (FAU), beta zeolite (BEA), and chabazite (CHA).

16. The process according to claim 12, wherein the hydrogenation metal of the second hydrocracking catalyst is at least one element selected from Group 10 of the periodic table of Elements.

17. The process according to claim 12, wherein the aluminosilicate zeolite comprised in the catalyst used in the second hydrocracking step (b) is selected from the group consisting of MCM-22 (MWW), mordenite (MOR) and ZSM-5 (WI).

18. The process according to claim 12, wherein steps (a) and (b) are performed in a single reactor.

19. The process according to claim 18, wherein the reactor has a first catalyst layer comprising the first hydrocracking catalyst and a second catalyst layer comprising the second hydrocracking catalyst, wherein a space or an inert layer is present between the first catalyst layer and the second catalyst layer.

20. The process according to claim 18, wherein the reactor has a first catalyst layer comprising the first hydrocracking catalyst and a second catalyst layer comprising the second hydrocracking catalyst, wherein the first catalyst layer is in contact with the second catalyst layer.

* * * * *